United States Patent
Lin et al.

(10) Patent No.: US 9,723,353 B2
(45) Date of Patent: Aug. 1, 2017

(54) REMOTE CONTROL FOR SMART TV AND SET-TOP BOX

(71) Applicant: SunASIC Technologies, Inc., New Taipei (TW)

(72) Inventors: Chi-Chou Lin, New Taipei (TW); Zheng-Ping He, Taipei (TW)

(73) Assignee: Sunasic Technologies Inc., New Taipei (TW)

(*) Notice: Subject to any disclaimer, the term of this patent is extended or adjusted under 35 U.S.C. 154(b) by 0 days.

(21) Appl. No.: 15/070,295

(22) Filed: Mar. 15, 2016

(65) Prior Publication Data

US 2016/0373800 A1  Dec. 22, 2016

Related U.S. Application Data

(60) Provisional application No. 62/180,229, filed on Jun. 16, 2015.

(51) Int. Cl.
| | | |
|---|---|---|
| H04N 7/16 | (2011.01) | |
| H04N 7/173 | (2011.01) | |
| H04N 5/44 | (2011.01) | |
| H04N 21/422 | (2011.01) | |
| H04N 21/4415 | (2011.01) | |
| G06K 9/00 | (2006.01) | |
| G08C 23/04 | (2006.01) | |
| H04N 21/475 | (2011.01) | |
| G08C 17/02 | (2006.01) | |

(52) U.S. Cl.
CPC ..... *H04N 21/42222* (2013.01); *G06K 9/0002* (2013.01); *G06K 9/00093* (2013.01); *G08C 17/02* (2013.01); *G08C 23/04* (2013.01); *H04N 21/4415* (2013.01); *H04N 21/4751* (2013.01); *G08C 2201/30* (2013.01); *G08C 2201/61* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,970,098 B1* | 11/2005 | Adams | ............... | G08C 23/04 |
| | | | | 340/12.3 |
| 7,921,297 B2* | 4/2011 | Ortiz | ............... | H04L 63/0861 |
| | | | | 713/182 |
| 9,460,332 B1* | 10/2016 | Bussat | ............... | G06K 9/0002 |
| 2003/0172283 A1* | 9/2003 | O'Hara | ............... | G08C 23/04 |
| | | | | 713/186 |
| 2004/0125077 A1* | 7/2004 | Ashton | ............... | G06F 3/03543 |
| | | | | 345/156 |
| 2007/0098235 A1* | 5/2007 | Halavee | ............... | G06K 9/0008 |
| | | | | 382/124 |

(Continued)

*Primary Examiner* — Nasser Goodarzi
*Assistant Examiner* — Fred Peng
(74) *Attorney, Agent, or Firm* — Che-Yan Chen; Law offices of Scott Warmuth

(57) ABSTRACT

A remote control for a smart TV or a set-top box is disclosed. The remote control includes a capacitive fingerprint sensor, a processor and a wireless transmitter. The present invention takes advantages of the capacitive fingerprint sensor so that every user's personal data and corresponding setting for the smart TV or set-top box are available. Channel (or web-site) content rating can be achieved. Purchasing over TV can be safer than ever.

6 Claims, 6 Drawing Sheets

(56) References Cited

U.S. PATENT DOCUMENTS

2010/0332400 A1\* 12/2010 Etchegoyen ............ G06F 21/32
705/75
2014/0281568 A1\* 9/2014 Ross ....................... G06F 21/32
713/186

\* cited by examiner

| User | Fingerprint | User ID | Authentic Data | TV Channel | URL and Service |
|---|---|---|---|---|---|
| A | a1 | 00001 | Yes URL 4 | All Channels | All URLs |
| A | a2 | 00002 | Yes URL 4 | All Channels Except Channel 6 | All URLs |
| B | b | 00003 | Yes URL 3 | All Channels Except Channel 6 | All URLs |
| C | c | 00004 | No | Channel 1 to Channel 4 From 7:00 PM to 9:00 PM | Some prohibited web sites and URL 3 and URL 4 are not available |
| D | d | 00005 | No | Channel 1 and Channel 4 | URL 1 only |

Fig. 5

REMOTE CONTROL FOR SMART TV AND SET-TOP BOX

FIELD OF THE INVENTION

The present invention relates to a remote control. More particularly, the present invention relates to a remote control for interacting with smart TVs and set-top boxes.

BACKGROUND OF THE INVENTION

Generally, a modern TV set goes with a remote control. The remote control is used for users to control the TV set, e. g. switch TV channels and volume adjustment. TV sets utilize coaxial cables or radio waves as a media to transmit TV contents. However, the specifications are not compatible with Internet. Many internet services, such as YouTube, are not available at a traditional TV set. Therefore, there was a trend to incorporate Internet service into TV sets in the past years. Here come smart TVs. Before the smart TVs prevail in the market, set-top boxes are used to link the traditional TV sets, and it is still a popular product for a high resolution screen to Internet services now. For remote controls of new generations, it is not only to have general functions for TV control, but also needs to add new design for surfing the Internet. These remote controls are also "smart" to the smart TVs or set-top boxes.

Another issue for a designer of remote controls to consider is that the remote control has limited surface and size (actually, it is getting smaller than ever), it is not convenient for users to key in data according to a channel's request, or even using social program over the smart TV. A touch screen may be a good interface for users. However, if the same data, such as a user name or a password, must be keyed in again and again when one restricted channel is watched, it is an annoying issue.

In addition, some TV channels or secured web sites may request authentication before a specific service, e.g. purchasing or transferring money, begins. Authentic data provided by the service providers may be a very long number or mixed alphabets thereto, or an encrypted code. It may be reserved in the smart TV and enabled whenever it is requested. However, like PCs in the interne, people worry about that the authentic data may be copied or the system storing the authentic data is hacked. It will lead to a serious consequence of leakage of personal information. This is what a smart TV owner would not like to see. The solution may depend on the remote control.

Therefore, a newly developed remote control for interacting with smart TVs and set-top boxes to fulfill the above requirements is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requests mentioned above, a remote control for a smart TV or a set-top box is disclosed. The remote control includes: a capacitive fingerprint sensor, for fetching fingerprint images; a processor, having a memory unit, for generating a fingerprint data from each fingerprint image, storing the fingerprint data with corresponding user data in the memory unit, comparing the fingerprint data from one fetched fingerprint image with the stored fingerprint data, and activating a preset function on the smart TV or the set-top box, or activating a remote service through the smart TV or the set-top box while the fingerprint data from the fetched fingerprint image matches a stored fingerprint data; and a wireless transmitter, for sending a delivery message to activate the preset function or the remote service to the smart TV or the set-top box. If the fingerprint data from the fetched fingerprint image doesn't match any stored fingerprint data, the processor processes an age estimating algorithm on the fetched fingerprint image and generates an age estimating information as a part of the delivery message.

Preferably, the delivery message is encrypted and contains a result of the comparison of the fingerprint data and the user data.

Preferably, the delivery message further contains the age estimating information.

Preferably, the fingerprint data is obtained by applying an irreversible function to transform a set of minutiae features, a fingerprint pattern, a set of locations of skin pores or a combination thereof Preferably, the user data comprises a user ID issued by the smart TV or the set-top box.

Preferably, the user data further comprises an authentic data for authentication for a specific service.

Preferably, the age estimating information is an age distribution of an owner of the fetched fingerprint image. The age estimating information may also be gender of an owner of the fetched fingerprint image.

Preferably, the remote service is provided by a third party over a network and the smart TV or a TV the set-top box is installed to is used as an interface to display related contents and interact with users; a requested data corresponding to the related contents transmitted from the processor to the third party via the smart TV or the set-top box is encrypted and not kept by the smart TV or the set-top box.

The present invention takes advantages of a capacitive fingerprint sensor so that every user's personal data and corresponding setting for the smart TV are available. Channel (or web-site) content rating can be achieved. Purchasing over TV can be safer than ever.

BRIEF DESCRIPTION OF THE DRAWINGS

FIG. 5 is a table of registration of fingerprints.

DETAILED DESCRIPTION OF THE PREFERRED EMBODIMENTS

The present invention will now be described more specifically with reference to the following embodiments.

Figure 1:
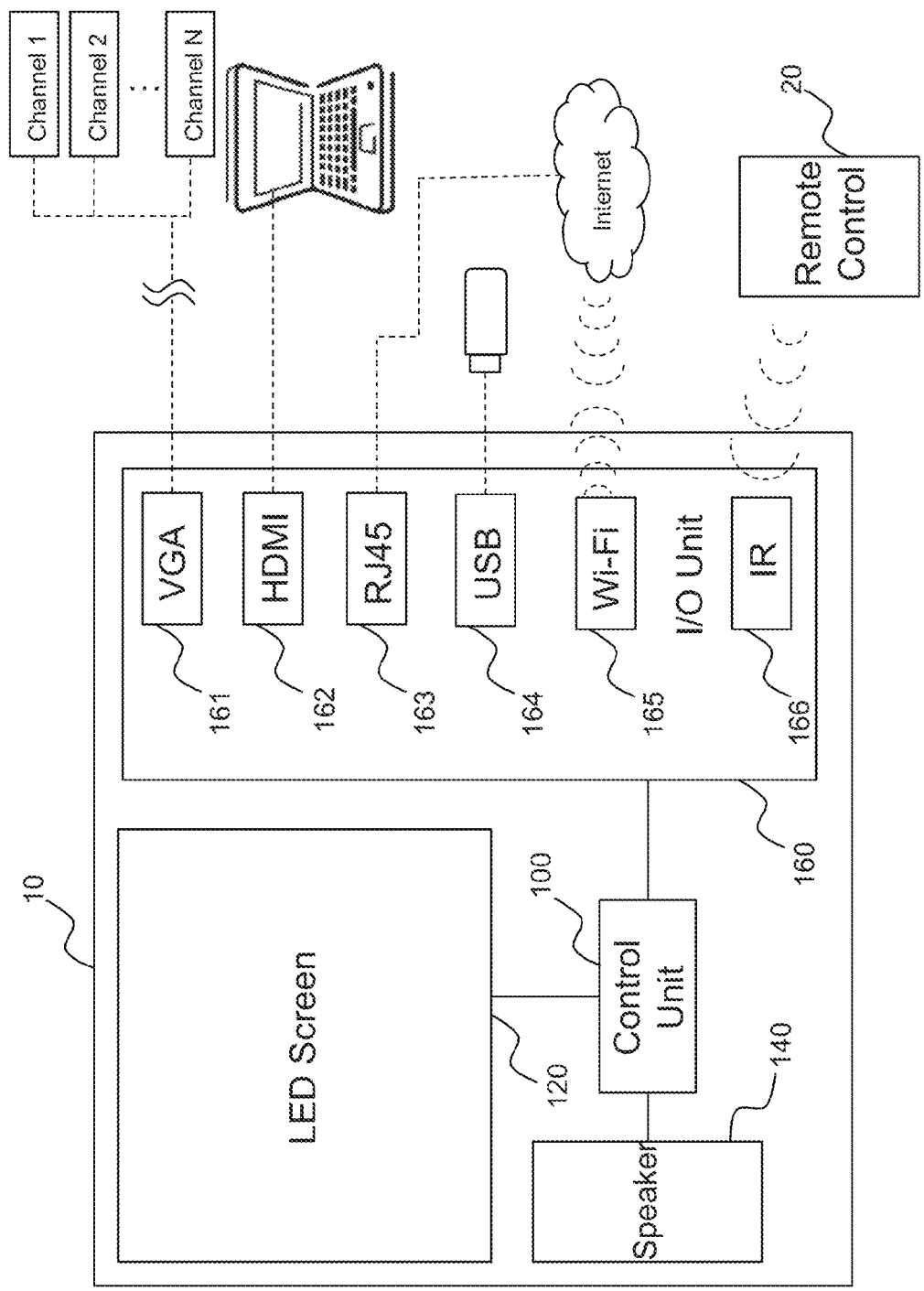
FIG. 1 shows architecture of a smart TV.

Please see FIG. 1. FIG. 1 illustrates architecture of a smart TV 10. It should be emphasized that the smart TV 10 is used for illustrative purposes. In fact, the architecture equals a traditional TV set installed with a set-top box. The set-top box makes up a deficiency that a smart TV provides but the traditional TV set doesn't have for the traditional TV. The smart TV 10 basically has below main elements: a control unit 100, a LED (Light Emitting Diode) screen 120, a speaker 140 and an I/O (Input/Output) unit 160. If the smart TV 10 is compared to a computer, the control unit 100 is the CPU (Central Processing Unit) of the computer. The control unit 100 deals with signal control (data input and output), commands from users (in this embodiment, a remote control 20), program setting (specific contents provided to specific user), power control and function adjustment. There are many ways of data input. For example, the I/O unit may manage signals go through a VGA (Video Graphics Array) port 161 for TV programs, a HDMI (High-Definition Multimedia Interface) port 162 for external video or image from a laptop computer or a DVD player, a RJ45 port 163 for data transmitted in the internet or local area network, a USB (Universal Serial Bus) port 164 for contents from USB devices or USB cable, a Wi-Fi port 165 for wireless data transfer and an IR (Infrared) port for control of the smart TV 10. The signals from above elements may have to be shown on the LED screen 120, or even make sound out of the speaker 140. Processing these signals and making response is the main job of the control unit 100.

Figure 2:
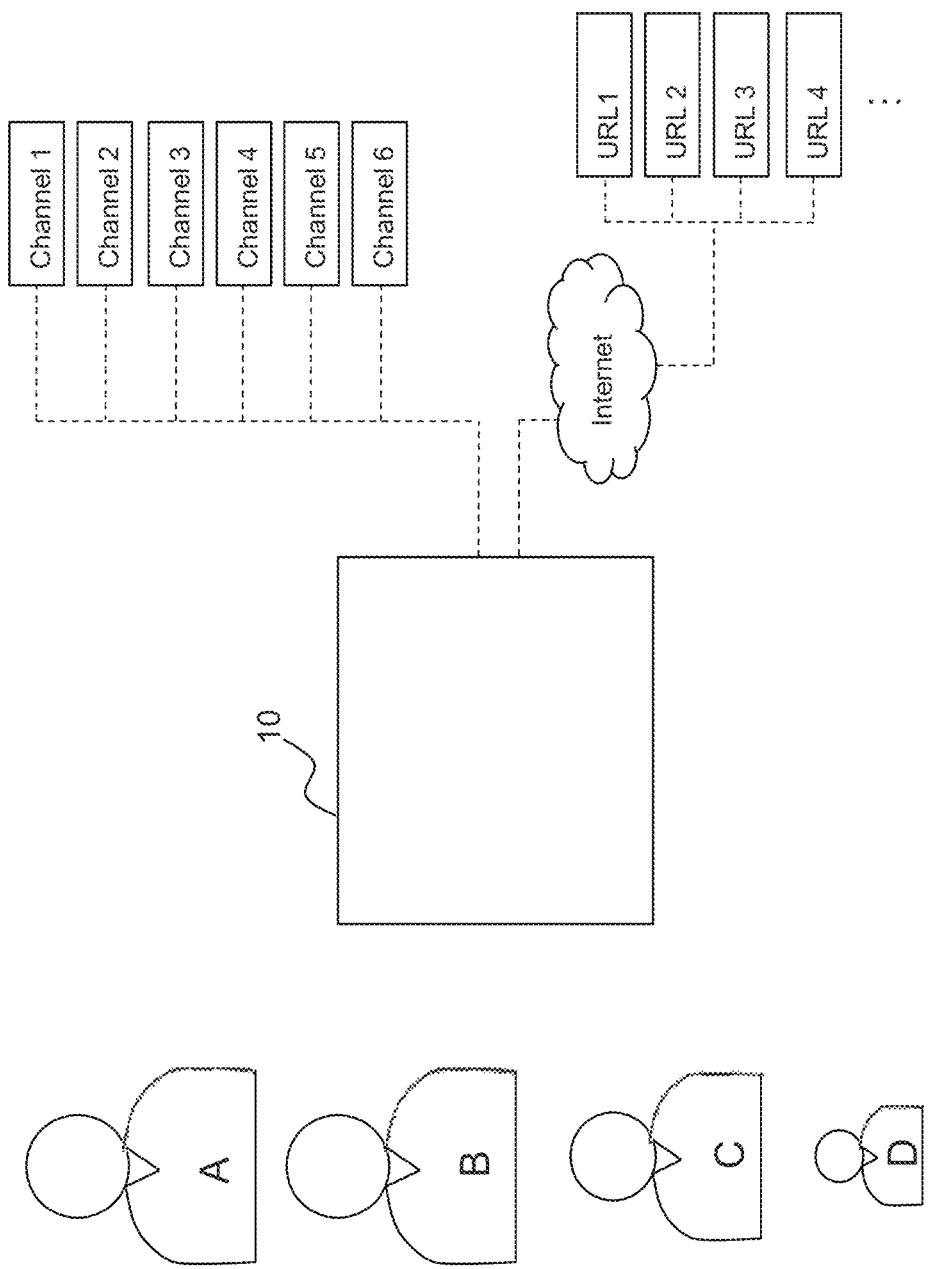
FIG. 2 depicts content requirement.

It is obvious that the smart TV 10 can be used as a desktop computer to surf the internet which is not workable for a traditional TV set. Hence, including current TV channels, there are many internet resources from different URLs (Uniform Resource Locator) not suitable for every user (viewer). For example, a restricted TV channel containing violence, and a web site providing streaming services of pornography films are not allowed for teen viewers. The smart TV 10 can set channels and URLs for different viewers. For example, please refer to FIG. 2. A family owns the smart TV 10 includes four viewers, a viewer A (father), a viewer B (mother), a viewer C (elder brother) and a viewer D (younger sister). The viewer A and viewer B can watch all public TV channels (channel 1 to channel 5). In addition, the viewer A wants to see a restricted channel, channel 6, and wouldn't like to have other family members to know. It can be available just paying an extra bill to a TV content provider to buy a passkey to access the blocked channel. However, this passkey may only be held by the viewer A. Meanwhile, channel 5 is a MOD (Movie On Demand) channel, every film or project (for example an on-line game) is charged before people enjoy it. Thus, the parents (viewer A and viewer B) don't want their kids (viewer C and viewer D) to do any purchasing actions on that channel. Thus, viewer C and viewer D must be limited to channel 5 by authorization (may be by user name and password which are not available by the kids). Viewer C is a schoolchild and is not allowed to watch TV all the time. Channel 1 to channel 4 are open to him during 7:00 PM to 9:00 PM. Viewer D is a preschool child. Channel 1 to channel 4 are all open to her as long as the parents can stand by her. The smart TV 10 can be set to fulfill the requirements.

Besides, the family can also use the smart TV 10 to surf the web sites over interne or enjoy services from specific URLs (e.g. YouTube or Gmail service). There are countless web sites (or URLs) available by a browser of the smart TV 10. Take four URLs (URL 1 to URL 4) as examples. URL 1 links to a language teaching web site which is welcome by the family. Viewer D is encouraged to and only can surf that web site. Contents of URL 2 are safe for everyone but only viewer A, viewer B and viewer C can access. URL 3 provides a women on-line shopping service. It needs a set of user name and password to login. Thus, viewer B is the only one who uses the service. URL 4 is an on-line men's club. It requires user name, password and an authentic data which is sent from the browser and cannot be seen when the web page is on for security reasons. Viewer A registers to that web site and can access it. Although the above services can be provided by the smart TV 10, viewers can key in necessary information before any channel or website is initiated. However, keying in data through the remote control 20 is very inconvenient. People need one time key-in of all necessary data for one specific service and enjoy the service next time with the necessary data are automatically prepared by the smart TV 10, while the processes the smart TV 10 carries on will not endanger security of data. The remote control 20 has a special design to fulfill these requirements.

Figure 3:
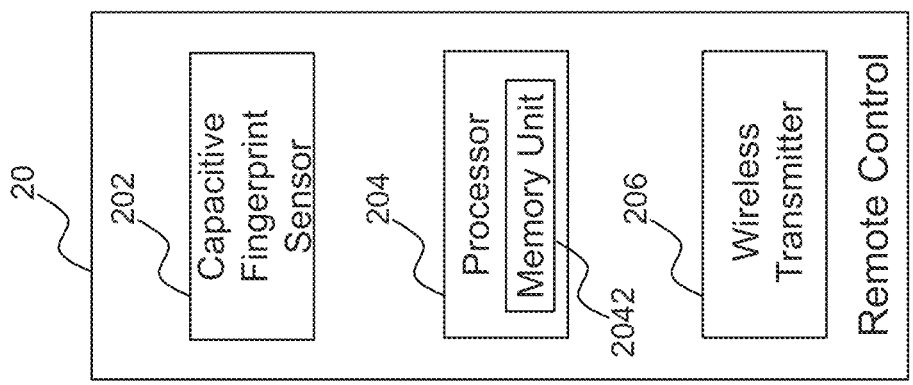
FIG. 3 shows architecture of a remote control.

Please see FIG. 3. It shows architecture of the remote control 20. The remote control 20 is composed of a capacitive fingerprint sensor 202, a processor 204 and a wireless transmitter 206. The capacitive fingerprint sensor 202 is different from an optical type fingerprint sensor. It is very thin to be mounted on the remote control 20 so that the remote control 20 doesn't need to be thick. The capacitive fingerprint sensor 202 can fetch fingerprint images. The processor 204 has a memory unit 2042 inside. The memory unit 2042 may be a flash memory, a ROM (Read Only Memory), an EEPROM (Electrically-Erasable Programmable Read-Only Memory) or a RAM (Random Access Memory). The reason the processor 204 has the memory unit 2042 is to make data transmission safer than current architecture of processor. For example, an ARM-v8 architecture has a design of secure internal memory and can be used for the processor 204. In addition, the processor 204 can generate fingerprint data from each fingerprint image. The fingerprint data is a data derived from the fingerprint image. Normally, it is digital and composed of a series of 0 and 1. The fingerprint data may be obtained by applying an irreversible function to transform a set of minutiae features, a fingerprint pattern, a set of locations of skin pores or a combination of the features from the fingerprint. In practice, cryptographic hash functions are applicable. It is not limited by the present invention. Thus, the processor 204 can store the fingerprint data with corresponding user data in the memory unit 2042. The user data may be a user ID issued by the smart TV or a set-top box. This will be described in details below. The user data may also further comprise the authentic data for authentication for a specific service from the URL mentioned above.

If there are a number of fingerprint data stored in the memory unit 2042, the processor 204 can compare a fingerprint data from one fetched fingerprint image with the stored fingerprint data to determinate whether the fetched fingerprint data matches the stored one. If the fingerprint data from the fetched fingerprint image matches a stored fingerprint data, the processor 204 may activate a preset function on the smart TV 10 (or a set-top box when the set-top box comes with a traditional TV). The preset function may be enabling a preset channel, controlling of volume and brightness, providing preset user name and password for a specific channel or web-site login, etc. The preset function is set based on different user data and can be fully customized. In general, the preset function can be for control of the smart TV 10 (or the set-top box) or data requested from a remote third party according to the user of the fetched fingerprint image. The preset function for the latter can save time for users in case the same data need to be keyed in every time.

Furthermore, under the same condition (the fetched fingerprint image matching a stored fingerprint data), the processor 204 may also activate a remote service through the smart TV 10 (or the set-top box). The remote service is provided by a third party over a network, e.g. Internet. The smart TV 10 or a TV which is installed with the set-top box is used as an interface to display related contents and interact with users. Here, the remote service is different from the preset function from a third party that a requested data corresponding to the related contents transmitted from the processor 204 to the third party via the smart TV 10 or the set-top box is encrypted and not kept by the smart TV 10 or the set-top box. For example, the remote service may be MOD service which requests an authentication in addition to user data. The authentication can be encrypted and then stored in the memory unit 2042. The remote service may also be TV pay program which processes transaction for TV viewers when they buy something on the purchasing channel. It needs authentication to do so. The smart TV 10 or the set-top box will never keep the data of the authentication.

A result of the comparison of the fingerprint data and the user data are encrypted as a delivery message. The delivery message is then sent to the smart TV 10 via the wireless transmitter 206. Functions of the wireless transmitter 206 are to send the delivery message to activate the preset function or the remote service to the smart TV 10 or the set-top box. The delivery message can be used as certain information, e.g. the user name, password and even the encrypted authentication stored in the smart TV 10, and further sent to a URL (including the MOD channel managing interface via internet). Below is the example how the smart TV 10 co-operates with the remote control 20.

Figure 4:
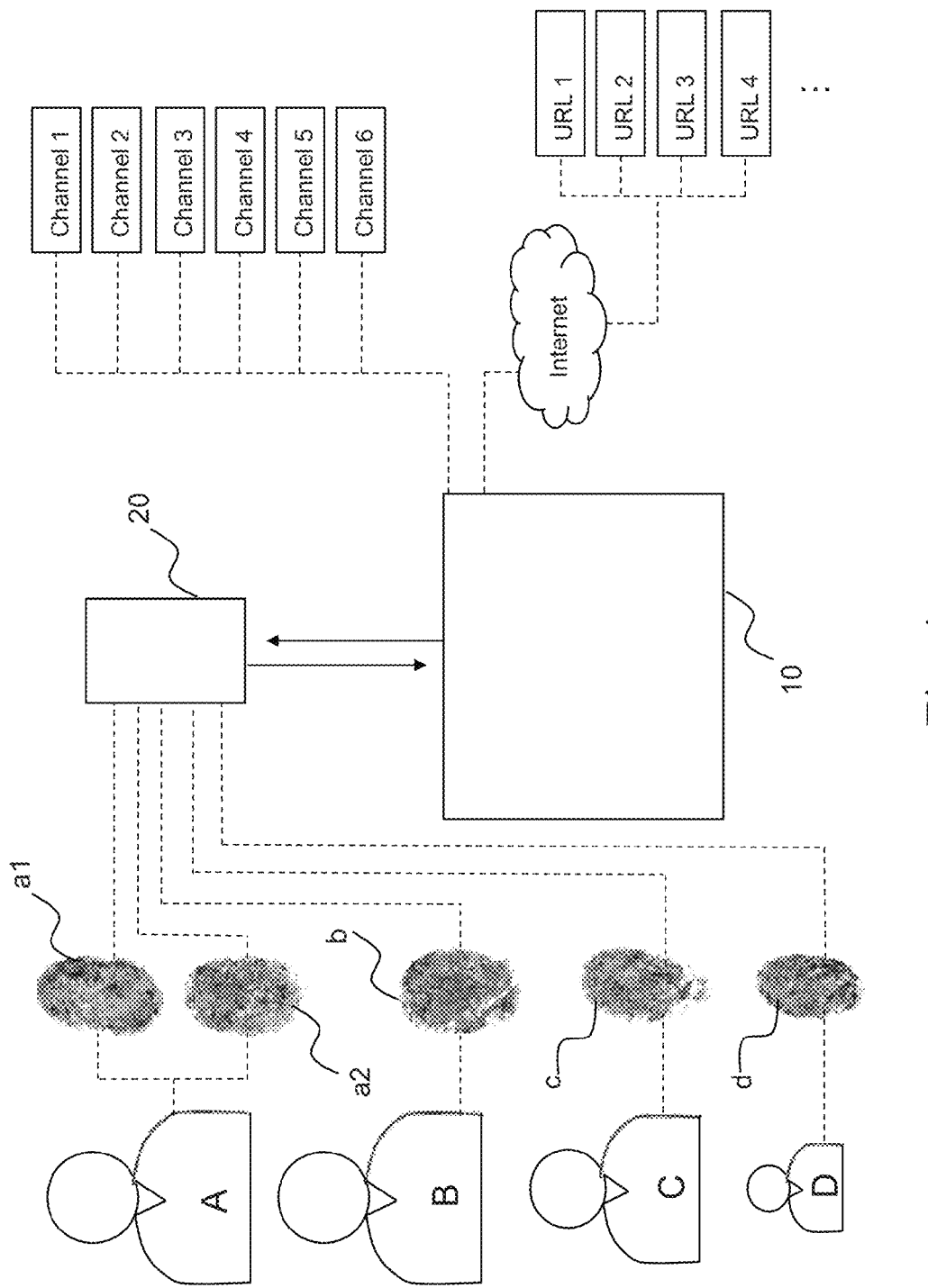
FIG. 4 shows how users register their fingerprints.

Please refer to FIG. 4 and FIG. 5 at the same time. After the family has the smart TV 10, they need to register their fingerprints for some specific settings first. According to the present invention, every user (viewer) of the remote control 20 can have all their fingerprints (from fingers in both hands) registered. For illustrative purpose, viewer A registers fingerprints from two fingers, a thumb and a forefinger. Others all register the fingerprints from their thumbs. When viewer A first registers his fingerprint to the remote control 20, he follows an instruction of the register process shown on the LED screen 120. When his first fingerprint a1 scanned and fetched by the capacitive fingerprint sensor 202, the remote control 20 communicates with the smart TV 10. The smart TV 10 issues a first user ID, 00001, to the remote control 20. Then, viewer A starts to process a setting for the first fingerprint a1 with the help of the LED screen 120. The first user ID represents a person who can see the contents from all channels and access all URLs (web sites) from the smart TV 10. As mentioned above, channel 5 requires user name and password. The user name and password are stored along with the first user ID in the smart TV 10. URL 4 needs user name, password and an authentic data. The user name and password are stored along with the first user ID in the smart TV 10 while the authentic data is stored with the first user ID in the remote control 20. It is a concern of data security in case the authentic data is hacked from the smart TV 10 (the smart TV 10 is connected to the internet).

Similarly, the smart TV 10 issues a second user ID, 00002, to the second fingerprint a2 of viewer A. The settings for the second user ID are listed in FIG. 5. The rest family members follow the process to finish registration of their fingerprints. If viewer C wants to turn on the smart TV 10 to watch TV programs, he can get his registered fingerprint scanned by the remote control 20. The remote control 20 recognizes the fingerprint c by comparing the fingerprint data from the scanned fingerprint with all fingerprint data stored in the memory unit 2042 and confirms a user of user ID, 00004. The delivery message comprising a comparison-passed information with the user ID (00004) is sent to the smart TV 10. The smart TV 10 allows viewer C to see channel 1 to channel 4 during 7:00 PM to 9:00 PM. Otherwise, the smart TV 10 is not turned on for viewer C. However, if viewer C wants to browse web sites, the smart TV 10 can let him to use the interne service. The only restriction is some prohibited web sites and URL 3 and URL 4 are not available.

If viewer B wants to turn on the smart TV 10 to watch TV programs, she can also get her registered fingerprint scanned by the remote control 20. The remote control 20 recognizes the fingerprint b and confirms a user of user ID, 00003. The smart TV 10 allows viewer B to see all channels and use interne service. If she wants to buy something over interne at URL 3, after a decision is made, the authentic data issued by the on-line shopping service will be sent to URL 3 along with the user name and the password. The authentic data already came with the delivery message. The smart TV 10 can receive the delivery message but cannot analyze it to get the authentic data. However, it is included in the related setting that the authentic data must be provided to URL 3 for viewer B according to a purchasing request.

If a guest would like to watch the smart TV 10, it needs another process to turn on the smart TV 10 and provide the services which the guest wants. The first step he or she should do is also to have one finger scanned so that the capacitive fingerprint sensor 202 can fetch the fingerprint image. After computing, a fingerprint data is got out of the fetched fingerprint. It is obvious that the fingerprint data has no match in the memory unit 2042. According to the present invention, the processor 204 processes an age estimating algorithm on the fetched fingerprint image to generating an age estimating information. Furthermore, the processor 204 encrypts the age estimating information along with the result of the comparison of the fingerprint data and a user data issued by the smart TV 10 as the delivery message.

The age estimating information is an age distribution of the guest. There are some techniques to estimate the age of a person by the fingerprint and any one of them can be applied. If possible, the age estimating information can tell the gender of the guest. Thus, a classification of TV program and internet service for different age ranges is available. For example, if the processor 204 estimate the guest is under 6 years old, a preset program and internet service can be the same as what set for viewer D; if the processor 204 estimate the guest is between 6 years old and 18 years old, a preset program and internet service can be the same as what set for viewer C; if the processor 204 estimate the guest is an adult, a preset program and internet service can be the same as what set for viewer B. Thus, channel (or web-site) content rating can be achieved. Of course, any kind of settings is accepted for each age range and not limited by the present invention.

Figure 6:
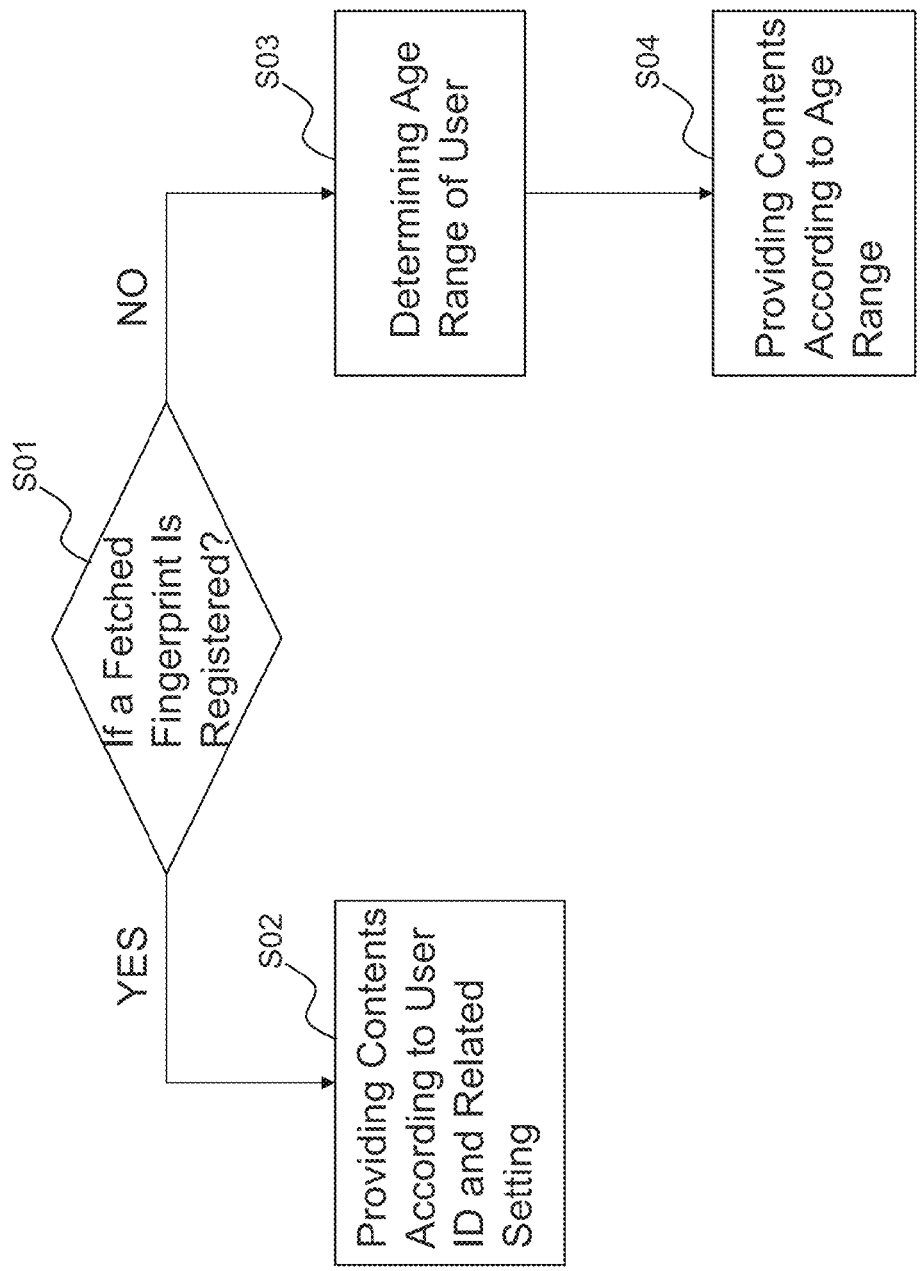
FIG. 6 is a flow chart showing how a smart TV provides services.

In general, a process for the remote control 20 to operate can be illustrated by FIG. 6. First, the remote control 20 needs to know if a fetched fingerprint is registered or not (S01). If yes, the smart TV 10 will provide contents according to a user ID for the fingerprint image (namely, the fingerprint data) and related setting in the smart TV 10. If not, the processor 204 of the remote control 20 will determine an age range of the user (S03), further providing contents according to the age range (S04).

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A remote control for a smart TV or a set-top box, comprising:
   a capacitive fingerprint sensor, for fetching fingerprint images;
   a processor, having a memory unit, for generating a fingerprint data from each fingerprint image, storing the fingerprint data with corresponding user data in the memory unit, comparing the fingerprint data from one fetched fingerprint image with the stored fingerprint data, and activating a preset function on the smart TV or the set-top box, or activating a remote service provided by a service provider over a network through the smart TV or the set-top box while the fingerprint data from the fetched fingerprint image matches a stored fingerprint data; and
   a wireless transmitter, for sending a delivery message to activate the preset function or the remote service to the smart TV or the set-top box,
   wherein the processor generates an estimated age information as a part of the delivery message based on the fetched fingerprint image if the fingerprint data from the fetched fingerprint image doesn't match any stored fingerprint data in the processor;
   wherein an authentic data for authentication of a specific remote service is included in the user data while the remote service is to be activated;
   wherein the delivery message along with the authentic data is encrypted and transmitted from the processor to the service provider via the smart TV or the set-top box in response to a request for the authentic data issued by the service provider; and
   wherein the authentic data is stored in the remote control and not in the smart TV or the set-top box to prevent the authentic data from being stolen or hacked.

2. The remote control according to claim 1, wherein the delivery message is encrypted and contains a result of the comparison of the fingerprint data and the user data.

3. The remote control according to claim 1, wherein the fingerprint data is obtained by applying an irreversible function to transform a set of minutiae features, a fingerprint pattern, a set of locations of skin pores or a combination thereof.

4. The remote control according to claim 1, wherein the user data comprises a user ID issued by the smart TV or the set-top box.

5. The remote control according to claim 1, wherein the estimated age information is an age distribution of an owner of the fetched fingerprint image.

6. The remote control according to claim 5, wherein the estimated age information is gender of an owner of the fetched fingerprint image.

* * * * *